United States Patent
Schechter et al.

(10) Patent No.: US 8,345,045 B2
(45) Date of Patent: Jan. 1, 2013

(54) SHADER-BASED EXTENSIONS FOR A DECLARATIVE PRESENTATION FRAMEWORK

(75) Inventors: Greg D. Schechter, Seattle, WA (US);
Gerhard Schneider, Seattle, WA (US);
Ashraf A. Michail, Redmond, WA (US);
Brendan Clark, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1338 days.

(21) Appl. No.: 12/041,951

(22) Filed: Mar. 4, 2008

(65) Prior Publication Data
US 2009/0225079 A1    Sep. 10, 2009

(51) Int. Cl.
*G06T 15/50* (2011.01)
*G06T 15/60* (2006.01)
*G06T 1/00* (2006.01)
*G06F 17/00* (2006.01)

(52) U.S. Cl. .................................. 345/426; 345/418
(58) Field of Classification Search ............ 345/426
See application file for complete search history.

(56) References Cited

U.S. PATENT DOCUMENTS

| | | | |
|---|---|---|---|
| 7,548,238 B2 * | 6/2009 | Berteig et al. | 345/426 |
| 7,958,498 B1 * | 6/2011 | Brown et al. | 717/139 |
| 2005/0017973 A1 | 1/2005 | Cazabon et al. | |
| 2005/0041023 A1 | 2/2005 | Green | |
| 2005/0251787 A1 | 11/2005 | Dietrich et al. | |
| 2006/0059494 A1 | 3/2006 | Wexler et al. | |
| 2006/0071933 A1 * | 4/2006 | Green et al. | 345/426 |
| 2006/0098019 A1 | 5/2006 | Tarditi et al. | |
| 2006/0209067 A1 | 9/2006 | Pellacini et al. | |
| 2007/0091090 A1 | 4/2007 | Zhang | |
| 2008/0005547 A1 | 1/2008 | Papakipos et al. | |
| 2008/0030513 A1 | 2/2008 | Jiao et al. | |
| 2009/0189897 A1 * | 7/2009 | Abbas | 345/426 |

FOREIGN PATENT DOCUMENTS

JP      09501786 A     2/2007

OTHER PUBLICATIONS

"International Search Report", Filed Date Jan. 30, 2009, Application No. PCT/US2009/032611, pp. 1-11.
"NVIDIA Unveils the World's Most Advanced Game Development Platform", http://blog.codebeach.com/2007/03/nvidia-unveils-worlds-most-advanced.html, Mar. 2007.
Proudfoot, et al.,"A Real-Time Procedural Shading System for Programmable Graphics Hardware", In SIGGRAPH 2001 Conference Proceedings, pp. 1-12, 2001.
"The Implementation I'd Like to See in WPF for Writing GPU Shaders", http://blog.hackedbrain.com/archive/2008/02/19/6141.aspx, Feb. 19, 2008.
"Shaders in WPF", http://www.codeprof.com/dev-archive/218/153-119-2185873.shtm, Feb. 26, 2008.

* cited by examiner

Primary Examiner — Jacinta M Crawford

(57) ABSTRACT

Various technologies and techniques are disclosed for controlling a shader declaratively. A declarative programming model enables declarative statements to be used that control an instantiation of a shader in a declarative presentation framework. A shader-based effect that was specified declaratively is instantiated programmatically for rendering graphic effects for a software application. Declarative statements are sent to a shader processor to enable a shader to render the graphical effect customizations for the software application. A method is also described for utilizing a declarative programming model as a multiple pass effect that controls and encapsulates a set of shaders to be run during a multiple pass operation.

19 Claims, 14 Drawing Sheets

```
<Button x:Name="myButton" Width="200" Height="40" Content="Button">
  <Button.Resources>
    <ImageBrush x:Key="myImageBrush" ImageSource="someImage.jpg" />
  </Button.Resources>
  <Button.Effect>
    <custom:TextureSubtractEffect
      Top="{x:Static ShaderEffect.ImplicitInput}"
      Bottom="{StaticResource myImageBrush}"/>
  </Button.Effect>
</Button>
```

250 → (code block)
252 → Top line
254 → Bottom line

FIG. 5

```
<Rectangle Width="200" Height="400">
  <Rectangle.Fill>
    <EffectBrush>
      <EffectBrush.Effect>
        <custom:MandelbrotEffect Iterations="10" Center="0.2,0.4" Scale="132.2" />
      </EffectBrush.Effect>
    </EffectBrush>
  </Rectangle.Fill>
</Rectangle>
```

```
public class YFlipEffect : BasicShaderEffect
{
    public YFlipEffect()
    {
        PixelShaders.Add(new PixelShader() { UriSource =
            new Uri("yFlipEffect.fx.ps") });
    } protected override GeneralTransform EffectMapping
    {
        get
        {
            return new ScaleTransform(1, -1);
        }
    }
}
```

US 8,345,045 B2

SHADER-BASED EXTENSIONS FOR A DECLARATIVE PRESENTATION FRAMEWORK

BACKGROUND

A graphics processing unit (GPU) is a dedicated graphics rendering device for a computer. The GPU's of today are efficient at manipulating and displaying computer graphics, and their parallel structure makes them more effective than most general-purpose central processing units for a range of complex algorithms. CPU's can also have multiple processor cores. Like GPUs, multi-core CPU's can execute multiple operations in parallel.

Software developers that write software today would like to take advantage of this processing power in the software applications that they write. For example, in applications that require heavy processing resources, such as desktop or web-based applications that utilize a lot of graphic effects or multimedia, it would be helpful to utilize the power of the GPU or multi-core processors that are present in computers. However, while many platforms may utilize GPU or multi-core processor resources, the end developer is not typically able to easily construct applications that run on those platforms that can utilize the extra processing power contained in many computers today.

SUMMARY

Various technologies and techniques are disclosed for controlling a shader declaratively. A declarative programming model enables declarative statements to be used that control an instantiation of a shader in a declarative presentation framework. A shader specified declaratively is instantiated at a later time by a presentation framework for rendering graphic effects for a software application. In one implementation, the declarative programming model can be used as a single pass shader that controls and encapsulates a shader to be run during a single pass operation. In another implementation, a method is described for utilizing a declarative programming model as a multiple pass effect that controls and encapsulates a set of shaders to be run during a multiple pass operation. A custom method is invoked for a multiple pass effect. The custom method was derived from a multiple pass effects class. The custom method is provided with a context that allows the custom method to access shader context and control information to enable the custom method to control an operation of the multiple pass effect.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is some exemplary source code for one implementation illustrating the use of brushes as secondary inputs to a shader and implicit inputs to a shader.

FIG. 9 is exemplary source code for one implementation that illustrates the use of a shader in defining an effect brush

DETAILED DESCRIPTION

The technologies and techniques herein may be described in the general context as technologies and techniques for using a shader with a declarative programming model, but the technologies and techniques also serve other purposes in addition to these. In one implementation, one or more of the techniques described herein can be implemented as features within a software development platform such as MICROSOFT®.NET Framework, or from any other type of program or service that provides platforms for enabling developers to develop and/or customize software applications.

Figure 1:
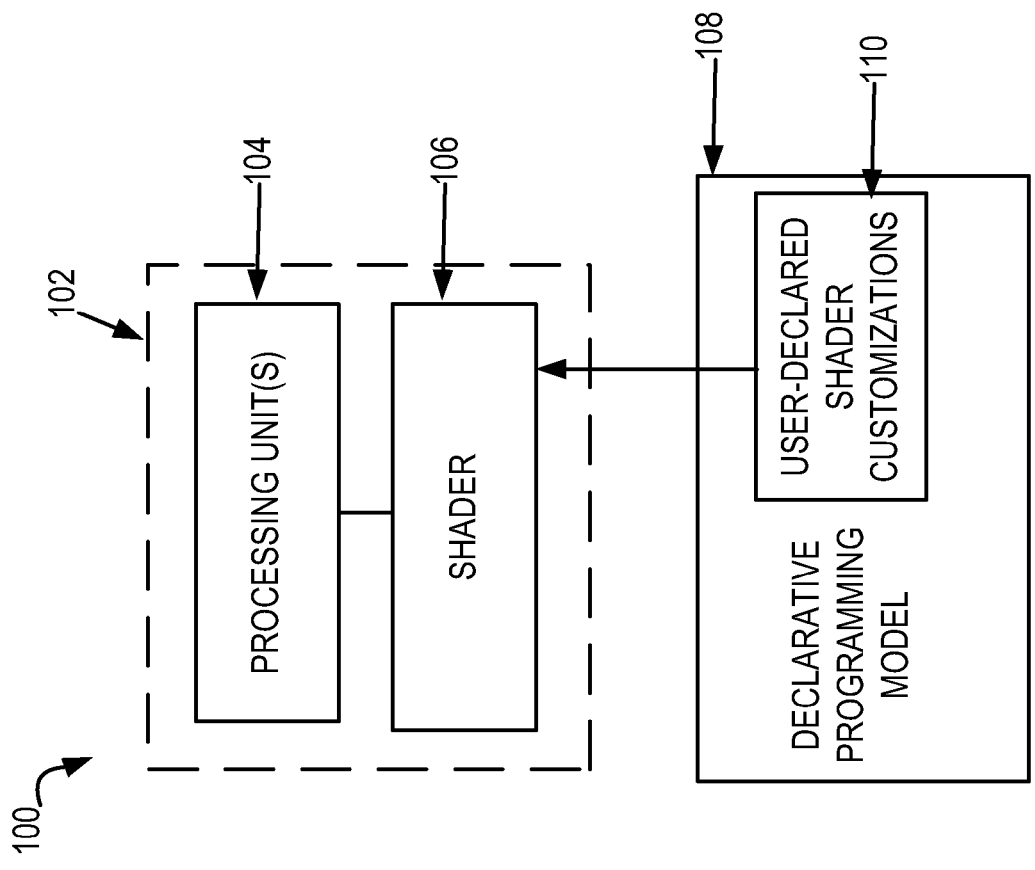
FIG. 1 is a diagrammatic view of a system for controlling an operation of a pixel shader.

Shown in FIG. 1 is a diagrammatic view of a system 100 for controlling an operation of a shader 106 using a declarative programming model 108 that runs on a declarative presentation framework. The term "declarative statement" and "declaratively" as used herein are meant to include text-based markup or imperative code that leaves the execution of that code to the underlying implementation of an associated declarative framework. Examples of declarative languages include Extensible Application Markup Language (XAML) and Extensible Markup Language (XML), to name a few non-limiting examples. The term "declarative programming model" as used herein is meant to include a programming model by which a developer or another user or program sets up the declarative statements for instantiating and using effects to be processed by an associated declarative framework. The term "declarative presentation framework" as used herein is meant to include systems that display and allow interaction with a more abstract description provided by the developer or another user or program through declarative statements using a declarative programming model. One non-limiting example of a declarative presentation framework is MICROSOFT® Windows Presentation Foundation (or WPF), which is a graphical subsystem feature of the MICROSOFT®.NET Framework (starting with version 3.0). WPF provides a consistent programming model for building applications and provides a clear separation between the user interface logic and business logic. Another non-limiting example of a declarative presentation framework is MICROSOFT® Silverlight.

The term "shader" as used herein is meant to include a set of computer instructions which are used by the graphic resources primarily to perform graphical rendering effects. There are different types of shaders that can be utilized in system 100, such as a pixel shader, a vertex shader, and/or a geometry shader. A vertex shader affects a series of vertices and thus can alter vertex properties like position, color, and texture coordinate. The vertices computed by vertex shaders are typically passed to geometry shaders. A geometry shader can add and remove vertices from a mesh. Geometry shaders can be used to procedurally generate geometry or to add volumetric detail to existing meshes that would typically be too costly to process on the processing unit. A pixel shader is more commonly known as a fragment shader, and calculates the color value of individual pixels when the polygons produced by the vertex and geometry shaders are rasterized. Pixel shaders are typically used for scene lighting and related effects such as bump mapping and color toning.

Shader 106 runs on one or more processing unit(s) 104. A few non-limiting examples of processing unit(s) 104 can include a graphics processing unit (GPU) or a multi-core processor. When shader 106 runs on one or more processing unit(s) 104, the term "shader processor" is used to refer to the execution of the shader on the processing unit(s) 104. As noted earlier, shader 106 is responsible for rendering effects for a given software application. Declarative programming model 108 enables a developer or other user to provide user-declared shader customizations 110. The shader customizations 110 enable the user to control an instantiation and/or operation of shader 106, as will now be described in further detail in the flows and code examples of FIGS. 2-13.

Figure 2:
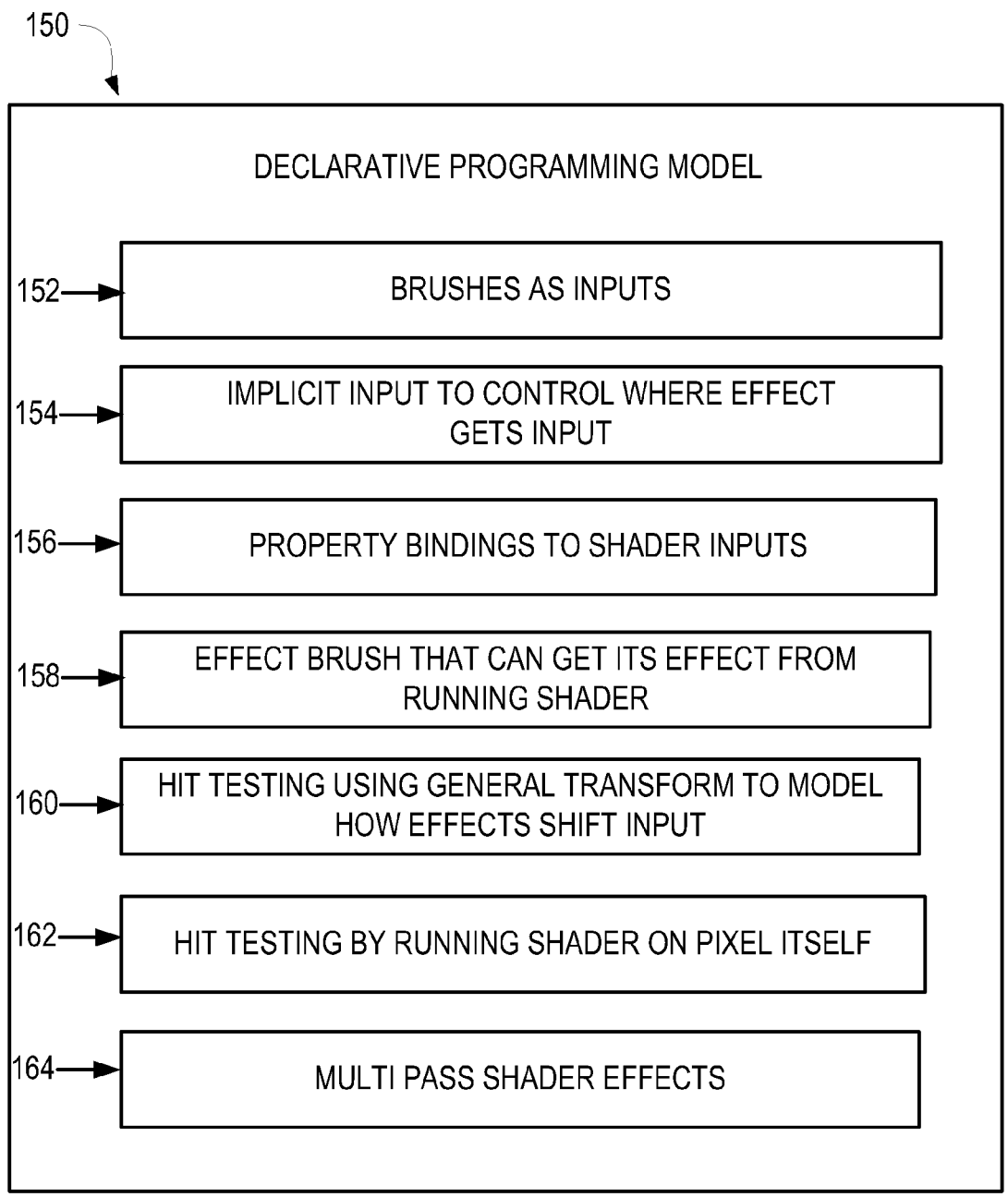
FIG. 2 is a diagrammatic view of a declarative programming model for one implementation that enables declarative statements to be used that control an instantiation and operation of a shader in a declarative presentation framework.

FIG. 2 is a diagrammatic view of a declarative programming model 150 for one implementation that enables declarative statements to be used that control an instantiation and operation of a shader in a declarative presentation framework. Declarative programming model 150 supports various features that can be specified declaratively for controlling a shader. In one implementation, the declarative programming model 150 can be used as a single pass shader that controls and encapsulates a shader to be run during a single pass operation. In another implementation, the declarative programming model 150 can be used as a multiple pass effect that controls and encapsulates a set of shaders to be run during a multiple pass operation. Multiple pass effects are described in further detail in the discussion of multiple pass effects 164 herein and in the discussion of FIG. 12.

Using declarative programming model 150, brushes can be specified as inputs 152 to a shader. The term "brush" as used herein is meant to represent an object that, when applied to fill a shape, is able to determine what color to place at what pixel location. More abstractly, a brush represents a mapping function from 2D space to a color. Example brushes include simple raster images, linear and radial gradients, live video sources, sources from other vector graphics renderings, etc. Brushes can serve as inputs to pixel shaders as well, and be presented to the shader itself as a "sampler" to be processed by the shader. Further details on utilizing a brush as input to a shader are provided in the discussion of FIGS. 4-5.

Declarative programming model 150 allows implicit input to be provided to a shader processor to control where a graphic effect gets input 154, such as its primary input. The term "implicit input" as used herein is meant to include "a pixel-based bitmap that results from rasterizing the user interface element that the effect/shader is being applied to". So, for example, if the effect is applied to a Button, then the "implicit input" is the bitmap that represents that button. An example of implicit input is described in further detail in FIG. 5.

Property bindings to shader inputs 156 are also supported by declarative programming model 150. The term "property binding" as used herein is meant to include declared properties of an object-oriented class definition that can be referenced for the sake of performing animation on, doing data-binding to, and otherwise having flexible control over. In some implementations, such properties are known as Dependency Properties. The term "shader input" as used herein is meant to include both "shader constants" and "shader samplers" that are made available to the shader via a register index. The term "shader constant" as used herein is meant to include a value provided to a shader program that remains constant throughout the execution of the shader program. A few non-limiting examples of shader constants include floating point values, colors, points, vectors, matrices, etc. The term "shader sampler" as used herein is meant to include a multidimensional array provided to a shader program that can be sampled within the shader program at a particular coordinate point. A few non-limiting examples can include 2D bitmaps and 3D texture volumes. In other words, the declarative programming model 150 enables dependency properties to be connected declaratively with shader inputs. Property bindings to shader inputs 156 are described in further detail in FIGS. 6 and 7. In one implementation, by supporting property bindings to shader inputs, those dependency properties can be passed to the shader without the developer that is using the shader (through a higher level object that includes the property declarations) having to even know about the shader implementation.

Declarative programming model 150 also allows an effect brush to be defined 158 that acts as a brush from running a shader. The term "effect brush" as used herein is meant to include any "brush" (as defined above) that defines its function from 2D space to color by execution of a shader or series of shaders. An effect brush can generally be used in a similar fashion as other brushes. Given a set of explicit inputs, an effect brush generates colors to fill its target that the brush is being applied to. Utilizing this feature, a system does not have to pre-render anything in order to run the shader. In other words, the effect brush feature enables the shader to run as the brush of a user interface element. Effect brushes are described in further detail in FIGS. 8 and 9.

Another feature supported by declarative programming model 150 is hit testing and coordinate space transformation using a general transform 160 to model how the effect shifts input. The term "hit testing" as used herein is meant to include processing of requests that ask for the position of a specified point in a coordinate space after the shader has been applied. The term "coordinate space transformation" as used herein is meant to include any mapping along a transformation hierarchy that includes needing to go through a shader-based effect, and having code that transforms the coordinates in the same manner that the shader potentially transforms pixels. Certain effects can move their content around so that when interacted with, the mouse or input pointer position needs to be transformed through the inverse of the transformation that the effect applies to. The hit testing using a general transform 160 feature enables how a certain effect will shift input to be modeled. For example, if an effect "swirls" a button, then the input pointer should register as being "over" the button when it is over the swirled representation of the button, and not when it's over the space that the button was originally in, but is no longer in. Hit testing using a general transform 160 is described in further detail in FIGS. 10 and 11.

Declarative programming model 150 also supports hit testing by running a shader on a pixel itself 162. This feature enables a shader to be run on a specified pixel to get an actual pixel coordinate. This represents one possible implementation of performing the coordinate space mapping required for hit testing as described above. This is described in further detail in FIG. 10.

Multiple pass effects 164 are also supported by declarative programming model 150. With multiple pass effects, there can be multiple levels of effects, which are embodied as a set of operations that happen on one shader at a time. A developer can control and extend the multiple passes of shaders using the declarative programming model 150. Multiple pass effects 164 are described in further detail in FIG. 12.

Turning now to FIGS. 3-13, the stages for implementing one or more implementations of the system for controlling shader operations are described in further detail. In some implementations, the processes of FIG. 3-13 are at least partially implemented in the operating logic of computing device 500 (of FIG. 14).

Figure 3:
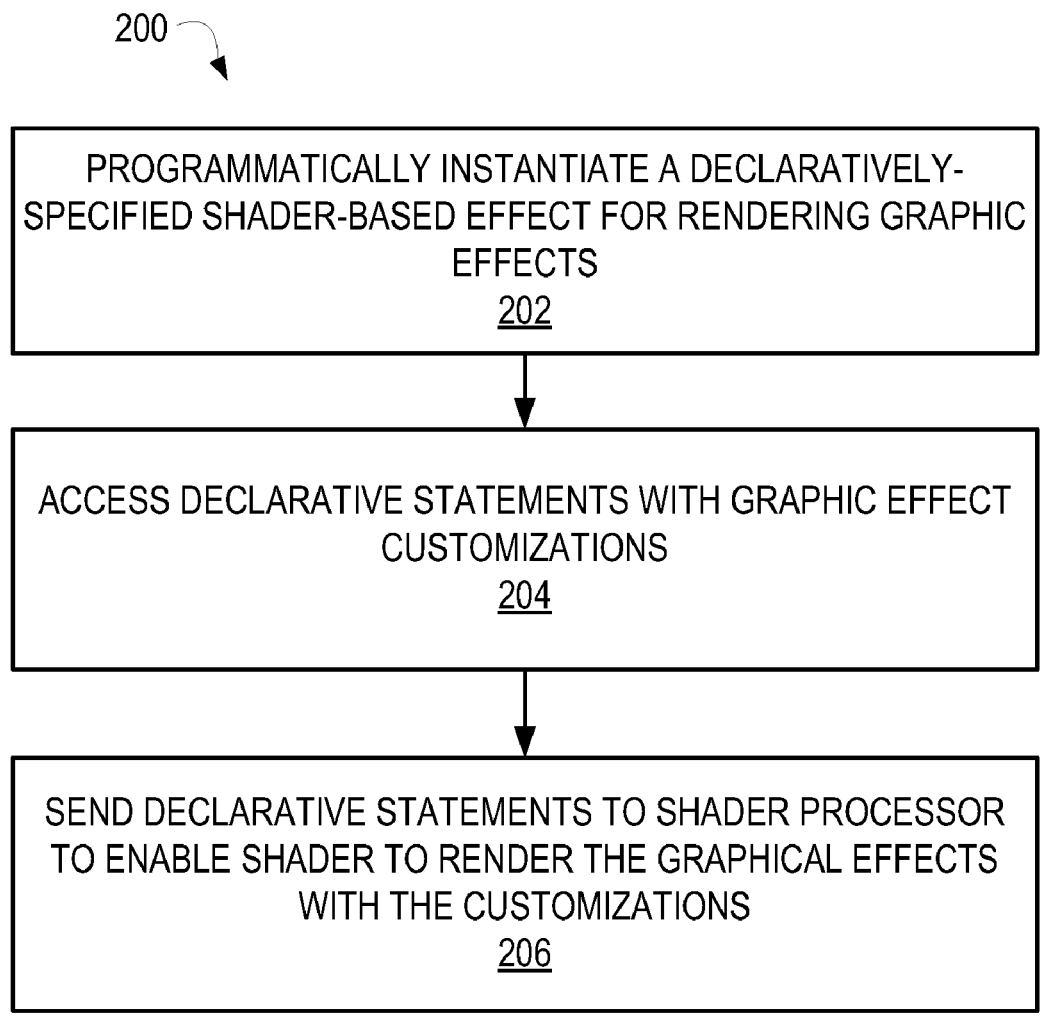
FIG. 3 is a process flow diagram for one implementation illustrating the stages involved in defining a shader-based effect using a declarative programming model.

FIG. 3 is a process flow diagram 200 for one implementation illustrating the stages involved in defining a shader-based effect using a declarative programming model. A shader-based effect that was referenced declaratively is programmatically instantiated by the declarative presentation framework for rendering graphic effects for a software application (stage 202). A few non-limiting examples of a shader can include a pixel shader, a vertex shader, and/or a geometry shader. Declarative statements are accessed for the software application (stage 204). In other words, the statements that contain graphic effect customizations for a shader are retrieved from one or more files that contain the declarative statement. In one implementation, the declarative statements are accessed throughout an operation of the shader as they are needed by the shader (stage 204). The declarative statements are sent to a shader processor to enable a shader to render the graphical effects for the software application with the graphic effect customizations (stage 206). In other words, declarative statements are sent to the shader processor and used by the shader to carry out the desired graphic effect customizations that were specified by a developer or other or program user in a declarative fashion. In one implementation, the declarative statements enable the graphic effect customizations to utilize (the power of) a processing unit upon which the shader runs, such as a GPU or multi-core processor.

Figure 4:
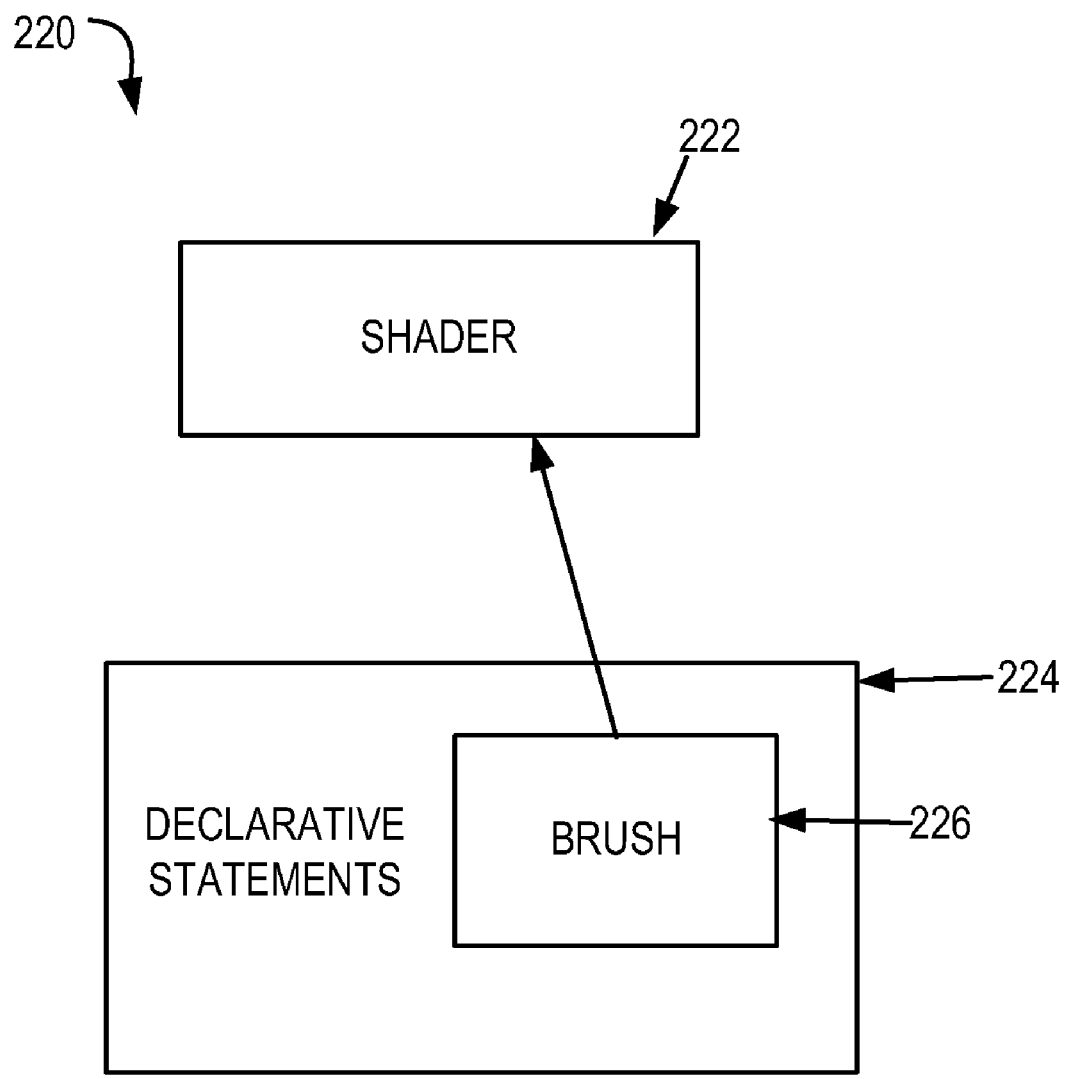
FIG. 4 is a diagrammatic view for one implementation illustrating a brush being used as input to a shader.

FIG. 4 is a diagrammatic view 220 for one implementation illustrating a brush 226 that was defined using one or more declarative statements 224 being used as input to a shader 222. Brushes allow features such as radial gradient, bitmap images, video, vector graphics, etc, to serve as input to a shader (as opposed to just bitmaps that some existing shaders support). A code example is shown in FIG. 5 to illustrate the concept of brushes in further detail.

FIG. 5 is some exemplary source code 250 for one implementation illustrating the use of brushes as secondary inputs to a shader and to illustrate the use of implicit inputs to a shader. In the example shown, a button called myButton has been specified declaratively. The button has been declared with a button effect that includes a brush 254 as an input for the bottom property of the texture subtract effect. The top property of the texture subtract effect includes an implicit input property 252 which represents the bitmap rendering of the element the effect is being applied to—in this case, the rendering of myButton. The end result is that the button will now look like the original button rendering with the image from brush 254 subtracted from it.

Figure 6:
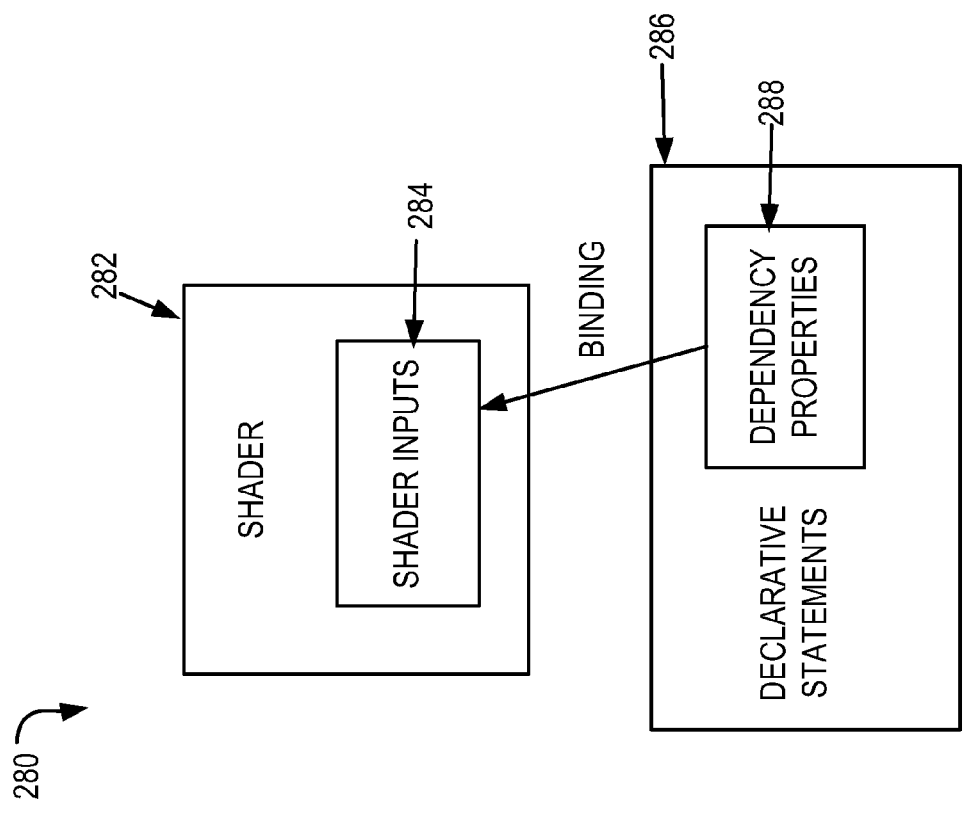
FIG. 6 is a diagrammatic view for one implementation illustrating the binding of properties to shader inputs.
Figure 7:
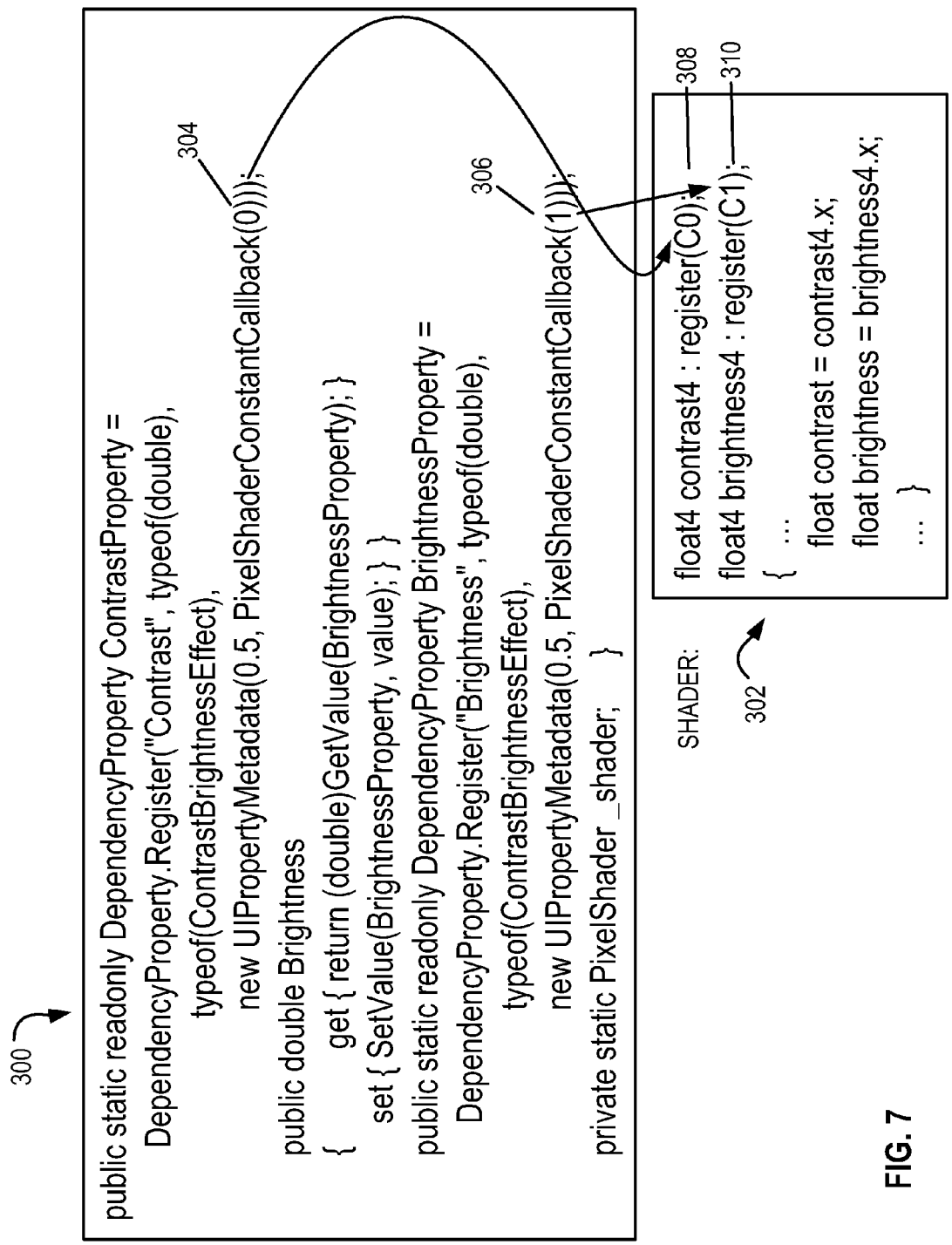
FIG. 7 is exemplary source code for one implementation that illustrates the binding of properties to shader inputs.

FIG. 6 is a diagrammatic view 280 of one implementation illustrating the binding of one or more dependency properties 288 to one or more shader inputs 284, which can be shader constants and/or samplers. As described earlier, shader inputs are made available to the shader via a register index. The dependency properties can be specified using declarative statements 286 to bind to shader inputs 284 of a given shader 282. In one implementation, by connecting dependency properties with shader inputs, the dependency properties can be defined and passed to the shader without the user having to worry about shader details. An example of binding dependency properties to shader inputs (more specifically, to shader constants) in a declarative fashion is shown in FIG. 7. In the exemplary source code shown in FIG. 7, two dependencies (304 and 306) on shader constants are declaratively specified. Those dependencies (304 and 306) are bound to actual registers of the shader 302, such as shader constants 308 and 310. In one implementation, the bindings are accomplished through the use of callbacks, which means that whenever the dependency property changes, a callback function is invoked that tells the declarative framework to update the shader input with the new value for the next time the effect, and thus the shader, is run.

Figure 8:
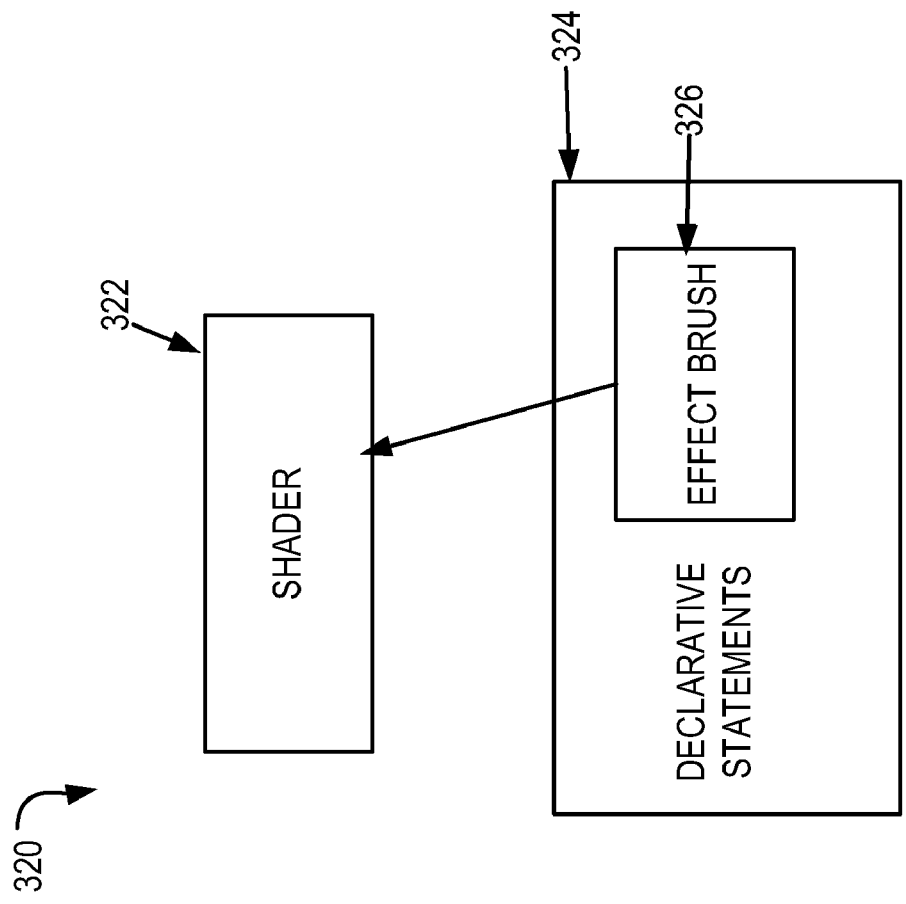
FIG. 8 is a diagrammatic view for one implementation that illustrates the use of a shader in defining an effect brush

FIG. 8 is a diagrammatic view 320 for one implementation that illustrates the use of a shader in defining an effect brush. As described in FIG. 2, an effect brush 326 can be defined using declarative statements 324 to act as a brush from running a shader 322. Given a set of explicit inputs, an effect brush 326 generates colors to fill its target that the brush is being applied to. The effect brush feature enables the shader 322 to run as the brush of a user interface element. Example source code 330 for declaratively specifying an effect brush 326 is shown in FIG. 9. In the example shown in FIG. 9, an effect brush is declaratively specified 332 with a custom effect 334. The custom effect 334 in the example shown will generate a fractal fill for a rectangle. In this example, the effect brush is used with a single parameter, Effect, that is of type Effect. Furthermore, the MandelbrotEffect is a custom ShaderEffect with three dependency properties that get passed to the underlying shader as shader inputs. The output of the effect is then used to fill the rectangle.

Figure 10:
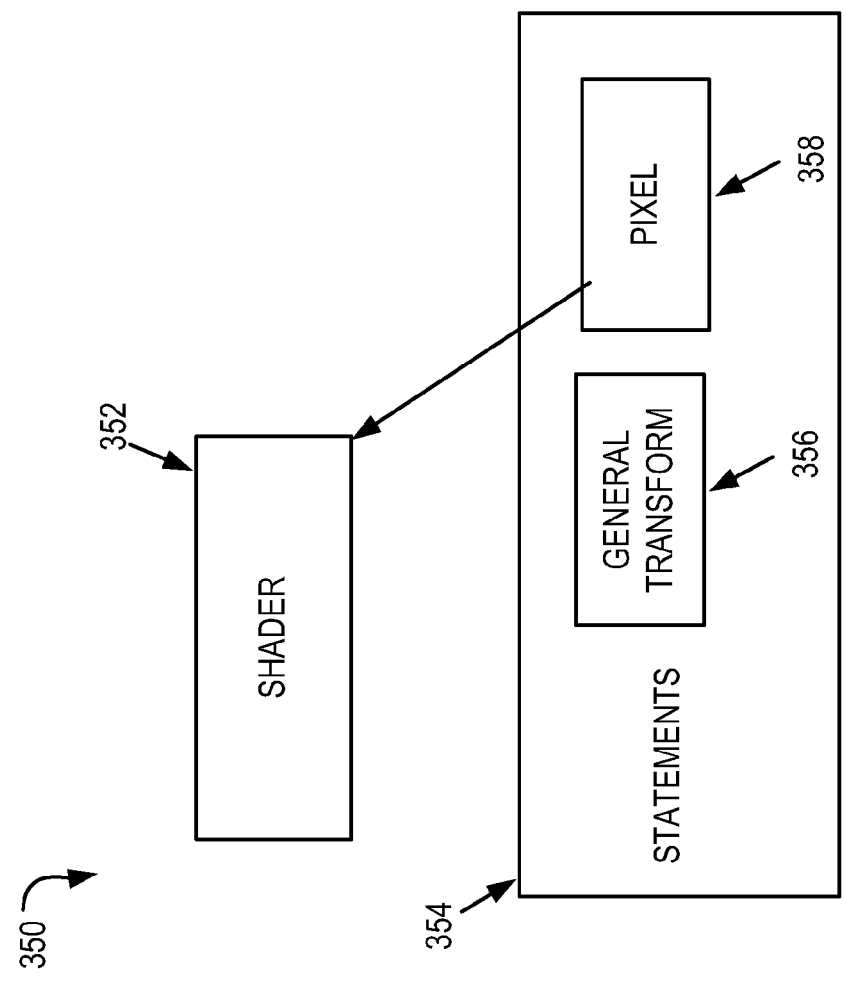
FIG. 10 is a diagrammatic view for one implementation that illustrates hit testing by using a general transform with a shader and/or by running the shader on the pixel itself
Figure 11:
FIG. 11 is exemplary source code for one implementation that illustrates hit testing by using a general transform with a shader.

Turning now to FIG. 10, a diagrammatic view for one implementation is shown that illustrates the performance of hit testing and coordinate space transformation by using a general transform 356 with a shader 352 and/or by running the shader 352 on a specific pixel 358. As described earlier, hit testing means processing of requests that ask for the position of a specified point in a coordinate space after the shader has been applied. A general transform 356 can be specified using statements 354 to enable hit testing and coordinate space transformation to be modeled. An example of a general transform is shown in the exemplary source code 380 of FIG. 11. Alternatively or additionally, hit testing can be performed by running the shader 352 on a specific pixel 358.

Figure 12:
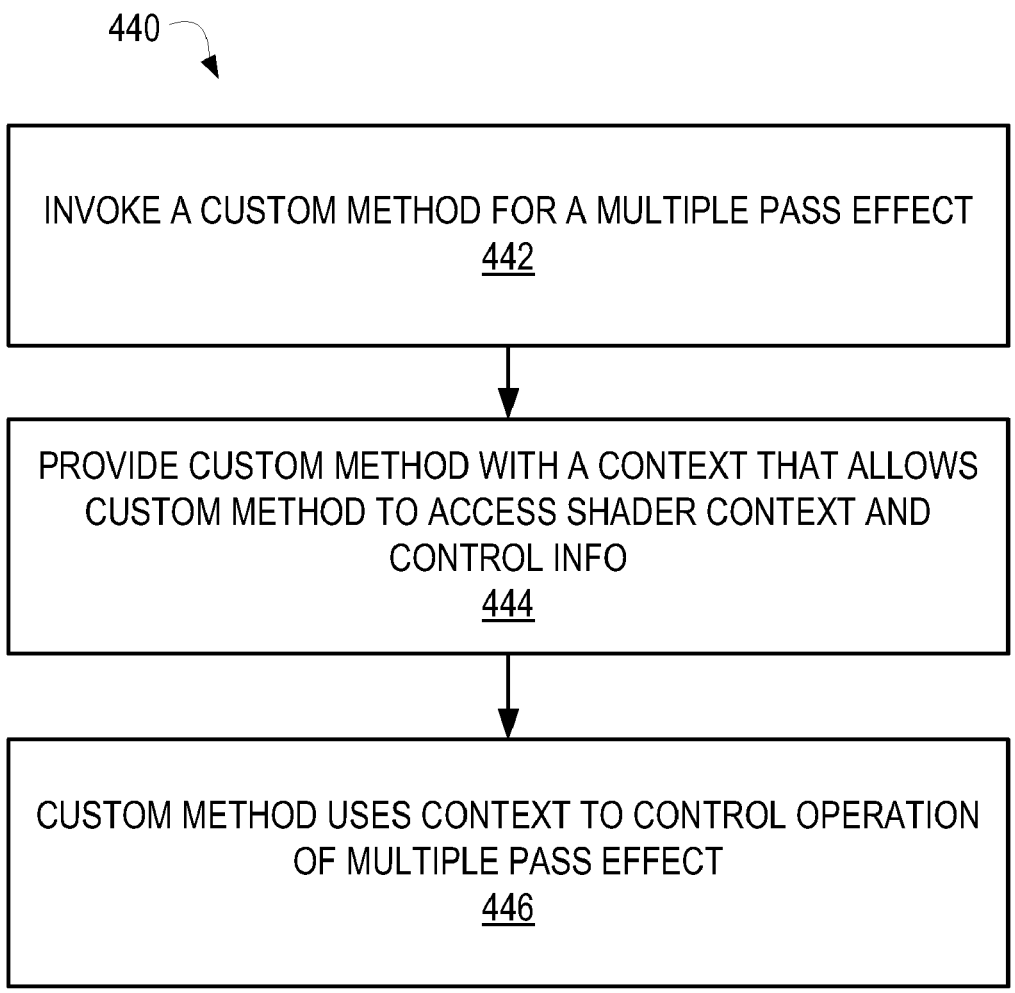
FIG. 12 is a process flow diagram for one implementation that illustrates a multiple pass effect that controls and encapsulates a set of shaders to be run during a multiple pass operation.

FIG. 12 is a process flow diagram 440 for one implementation that illustrates a multiple pass effect that controls and encapsulates a set of shaders to be run during a multiple pass operation. The term "multiple pass effect" as used herein is meant to include an effect that invokes potentially more than one shader multiple times in order to achieve the desired rendering. The term "multiple pass operation" as used herein is meant to include code that controls the running of the multiple passes and multiple shaders. A custom method is invoked for a multiple pass effect (stage 442). In one implementation, the custom method is derived from a multiple pass effects class. In one implementation, the custom method is defined so that it overrides an apply shaders (e.g. ApplyShaders) method. The apply shaders method contains logic for choosing a respective shader programmatically for each pass of a multiple pass effect in the custom method.

The custom method is provided with a context that allows the custom method to access shader context and control information (stage 444) to enable the custom method to control an operation of the multiple pass effect (stage 446). In other words, the custom method is invoked by the system and provided with a "context" that allows access and control of relevant information like shader indices, current global scale, shader constants, shader samplers, and/or the ability to select and execute a shader. Through this mechanism, the implementer of the multiple pass effect in the custom method is able to control multiple pass effect rendering.

In one implementation, by using the multiple pass effect feature, the user of a specific subclass of the multiple shader effect base class needs only to declaratively specify the effect in order to include that effect in the declarative graphics or user interface representation.

In one implementation, the graphic effect customizations are invoked on a composition thread for all passes in a given multiple pass effect. The composition thread is described in further detail in FIG. 13, which will now be discussed next.

Figure 13:
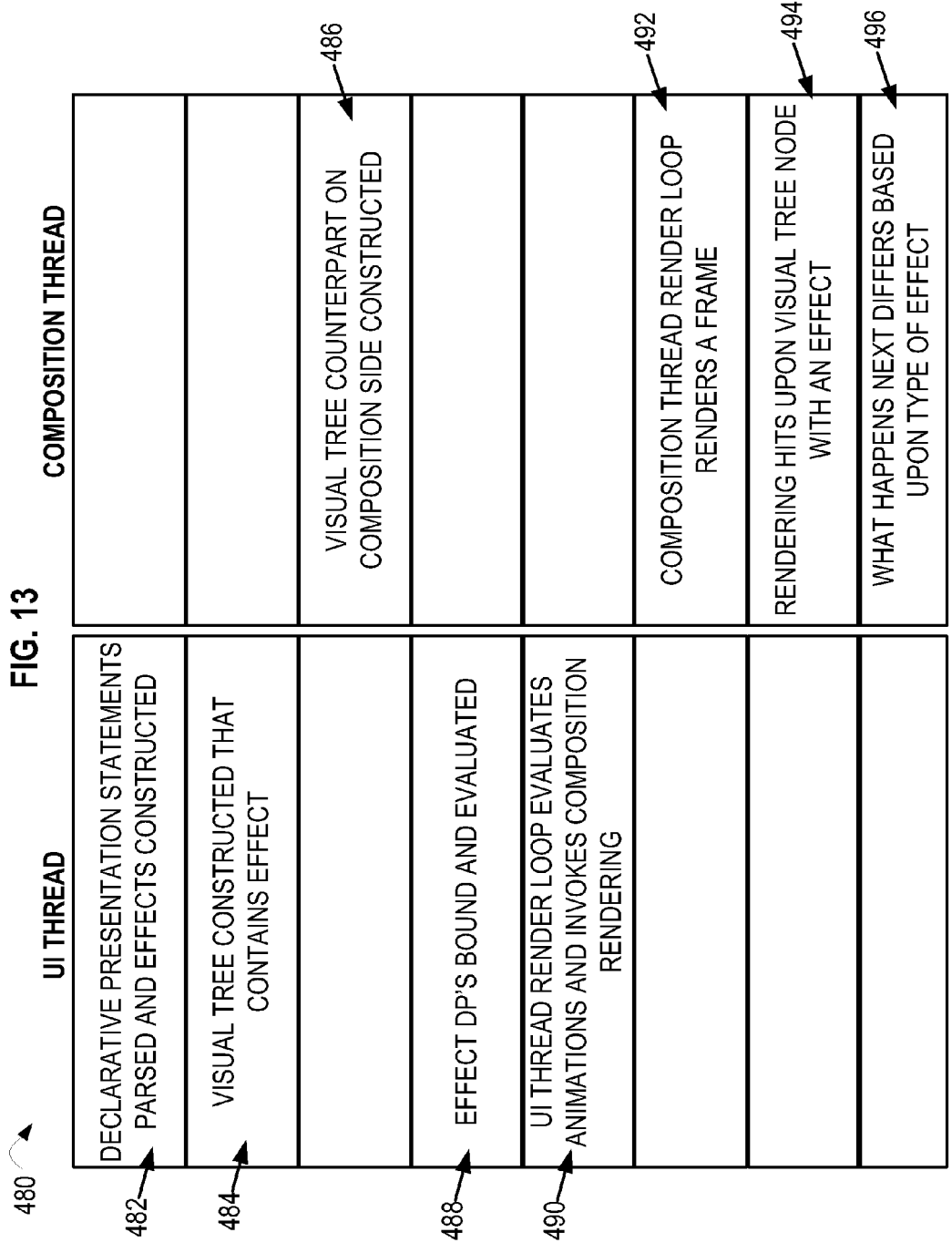
FIG. 13 is a diagrammatic view for one implementation that illustrates a flow of control from a user interface thread to a composition thread.

FIG. 13 is a diagrammatic view 480 for one implementation that illustrates a flow of control from a user interface thread to a composition thread. The term "user interface thread" as used herein is meant to include the primary thread of execution that the user-interface elements (buttons, text boxes, lists) of the application respond on. The term "composition thread" as used herein is meant to include a thread distinct from the user interface thread that controls the rendering of the display. Operations on the composition thread are not blocked by operations on the UI thread.

Returning to the diagram of FIG. 13, a control of flow is illustrated between a user interface thread and a composition thread. On the user interface thread, the declarative statements are parsed and effects are constructed (stage 482), and then a visual tree is constructed that contains the effects (stage 484). On the composition thread, the visual tree counterpart on the composition side is constructed (stage 486). Returning to the user interface thread, effect dependency properties are bound and evaluated (stage 488). While on the user interface thread, the user interface thread render loop evaluates animations and invokes composition rendering (stage 490). Then, the composition thread renders a frame (stage 492), and rendering hits upon the visual tree node with an effect (stage 494). In one implementation, what happens next differs based upon the type of effect being rendered (stage 496). In the case of a multipass effect, the ApplyShaders method will be invoked from the composition thread to control the execution of the effect. In the case of a single pass effect, enough information is already present on the composition thread for the composition thread to simply execute the effect without invoking any user code.

Figure 14:
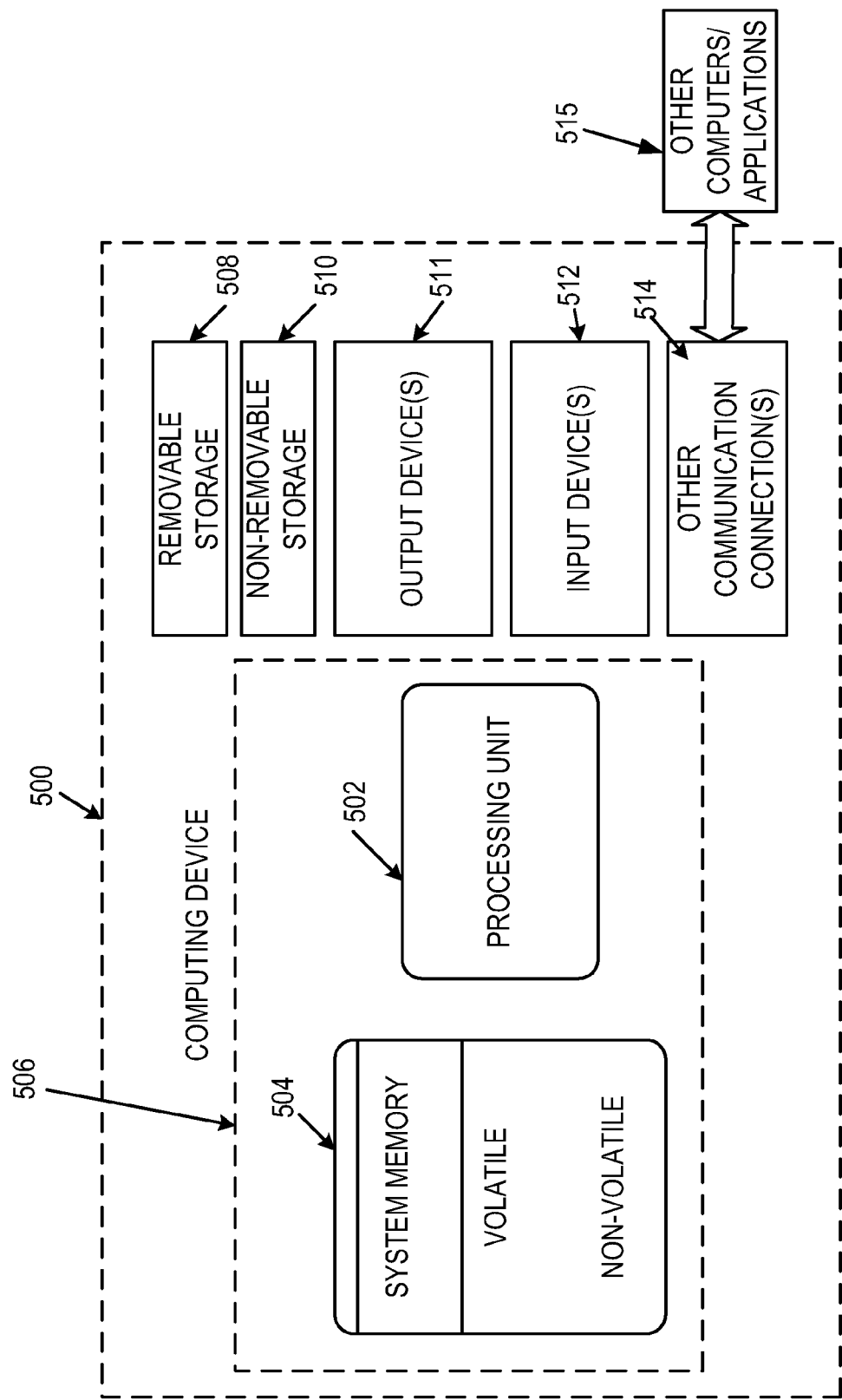
FIG. 14 is a diagrammatic view of a computer system of one implementation.

As shown in FIG. 14, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 14 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 14 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A system for controlling an operation of a shader comprising:
    a declarative programming model that enables declarative statements of a declarative language to be used that control an instantiation and operation of a shader in a declarative presentation framework, wherein the shader is operable to run on a graphics processing unit and the declarative programming model enables a software application to use the declarative programming model to utilize the graphics processing unit for graphical effects in the software application, wherein the declarative programming model is operable to allow brushes to be used as inputs to the shader.

2. The system of claim 1, wherein the declarative language is the Extensible Markup Language (XML).

3. The system of claim 1, wherein the declarative language is the Extensible Application Markup Language (XAML).

4. The system of claim 1, wherein the shader is operable to run on a processing unit with one or more cores.

5. The system of claim 1, wherein the declarative programming model is operable to allow implicit input to be specified to control where an effect being rendered by the shader gets input.

6. The system of claim 1, wherein the declarative programming model is operable to allow one or more dependency properties to be bound to a shader input through the use of a callback function such that whenever a dependency property changes, the callback function is invoked to inform the declarative framework to update the shader input with a new value a next time the shader is run.

7. The system of claim 1, wherein the declarative programming model is operable to allow an effect brush to be defined that acts as a brush by running the shader.

8. The system of claim 1, wherein the declarative programming model is operable to model how effects shift input.

9. The system of claim 8, wherein the modeling of how effects shift input is performed by using a general transform operation.

10. The system of claim 8, wherein the modeling of how effects shift input is performed by running the shader on a specified pixel.

11. The system of claim 1, wherein the declarative programming model is operable to allow multiple pass effects to be specified.

12. A method for defining a shader-based effect and using the shader based effect in a declarative programming model comprising the steps of:
   programmatically instantiating a shader-based effect for rendering graphic effects for a software application, the shader-based effect having been declaratively specified;
   accessing declarative statements for the software application, the declarative statements containing graphic effect customizations for a shader, the declarative statements written in a declarative language, the declarative language comprising the Extensible Markup Language or the Extensible Application Markup Language; and
   sending the declarative statements to a shader processor to enable the shader to render the graphical effects for the software application with the graphic effect customizations, the declarative statements allowing brushes to be used as secondary inputs to the shader and implicit inputs to be used as an input to the shader.

13. The method of claim 12, wherein the declarative statements are accessed throughout an operation of the shader as the declarative statements are needed by the shader.

14. The method of claim 12, wherein the declarative statements enable the graphic effect customizations to utilize a processing unit upon which the shader runs.

15. The method of claim 12, wherein the shader is of a type selected from the group consisting of a pixel shader, a vertex shader, and a geometry shader.

16. A method for utilizing a declarative programming model as a multiple pass effect that controls and encapsulates a set of shaders to be run during a multiple pass operation comprising the steps of:
   using a declarative statement written in a declarative language, the declarative language comprising the Extensible Markup Language or the Extensible Application Markup Language, invoking a custom method for a multiple pass effect, the custom method being derived from a multiple pass effects class; and
   providing the custom method with a context that allows the custom method to access shader context and control information to enable the custom method to control an operation of the multiple pass effect.

17. The method of claim 16, wherein the graphic effect customizations for all passes in a multiple pass effect in the custom method are invoked on a composition thread.

18. The method of claim 16, wherein the custom method overrides an apply shaders method.

19. The method of claim 18, wherein the apply shaders method contains logic for choosing a respective shader programmatically for each pass of a multiple pass effect in the custom method.

\* \* \* \* \*